United States Patent
Graupner et al.

(10) Patent No.: US 8,214,461 B1
(45) Date of Patent: Jul. 3, 2012

(54) METHOD OF PROCESSING REQUEST BY SERVER COMPUTER SYSTEM

(75) Inventors: Sven Graupner, Mountain View, CA (US); Sharad Singhal, Belmont, CA (US); James C. Pruyne, Naperville, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2317 days.

(21) Appl. No.: 10/999,639

(22) Filed: Nov. 23, 2004

(51) Int. Cl.
*G06F 15/16* (2006.01)

(52) U.S. Cl. ........ 709/219; 709/202; 709/203; 709/223; 709/224; 709/225; 709/226; 709/217; 719/315; 719/316; 719/318; 719/328; 719/329; 719/330; 707/755; 707/756; 707/999.104; 707/999.105; 707/999.106; 707/955; 707/960; 707/999.103; 714/100; 714/15; 714/49; 718/102; 718/104

(58) Field of Classification Search ................ 709/219, 709/201, 202, 203, 223–226, 217; 707/202, 707/755, 756, 999.103–999.106, 955, 960; 714/2, 15, 16, 20, 100, 49; 719/315–318, 719/328–330; 718/102, 104
See application file for complete search history.

(56) References Cited

U.S. PATENT DOCUMENTS

| | | | |
|---|---|---|---|
| 763,119 A * | 6/1904 | Sawyer | .......................... 139/363 |
| 4,126,895 A | 11/1978 | Weemaes | |
| 4,495,562 A | 1/1985 | Yamaji | |
| 5,077,661 A | 12/1991 | Jain | |
| 5,109,486 A | 4/1992 | Seymour | |
| 5,287,552 A | 2/1994 | Sasuta | |
| 5,590,328 A | 12/1996 | Seno | |
| 5,603,029 A | 2/1997 | Aman | |
| 5,630,133 A | 5/1997 | Hotea | |
| 5,634,127 A | 5/1997 | Cloud et al. | |
| 5,687,372 A | 11/1997 | Hotea | |
| 5,701,482 A | 12/1997 | Harrison | |
| 5,729,710 A * | 3/1998 | Magee et al. | .................. 711/203 |
| 5,745,694 A | 4/1998 | Egawa et al. | |
| 5,758,029 A * | 5/1998 | Hall | ................................ 706/46 |
| 5,889,989 A | 3/1999 | Robertazzi | |
| 6,058,426 A | 5/2000 | Godwin et al. | |
| 6,112,243 A | 8/2000 | Downs | |
| 6,141,759 A * | 10/2000 | Braddy | .......................... 726/14 |
| 6,185,609 B1 | 2/2001 | Rangarajan et al. | |

(Continued)

OTHER PUBLICATIONS

Coordinated Forward Recovery for Web Services; Ferda tartanoglu, Valerie Issamy, Alexander Romanovsky and Nicole Levy, In Proceedings of the 22nd IEEE symoposium of Reliable Distributed System, Florence Italy, Oct. 2003, pp. 1-10.*

(Continued)

*Primary Examiner* — Carl Colin
*Assistant Examiner* — Mohammad Siddiqi (57) ABSTRACT

In an embodiment, a method of processing a request by a server computer system begins with a step of receiving an object. The object comprises the request, an exception criterion, and a recovery operation. The method continues with a step of determining that the server computer system is unable to fulfill the request due to an exception which meets the exception criterion. The method concludes with a step of applying the recovery operation to resolve the exception. In an embodiment, the server computer system comprises a resource management system for a shared computing environment and the object comprises a resource request object. The resource request object comprises a resource request, the exception criteria, and the recovery operation. The resource request indicates resources requested from the shared computing environment by a start time and for a time period.

32 Claims, 8 Drawing Sheets

U.S. PATENT DOCUMENTS

| | | | |
|---|---|---|---|
| 6,237,009 B1* | 5/2001 | Waldo et al. | 707/206 |
| 6,256,740 B1* | 7/2001 | Muller et al. | 726/12 |
| 6,272,528 B1 | 8/2001 | Cullen et al. | |
| 6,289,446 B1* | 9/2001 | Nilsson | 712/244 |
| 6,347,253 B1 | 2/2002 | Fujita | |
| 6,349,343 B1* | 2/2002 | Foody et al. | 719/316 |
| 6,370,560 B1 | 4/2002 | Robertazzi | |
| 6,401,121 B1 | 6/2002 | Yoshida | |
| 6,434,555 B1 | 8/2002 | Frolund et al. | |
| 6,438,573 B1* | 8/2002 | Nilsen | 718/100 |
| 6,442,552 B1 | 8/2002 | Frolund et al. | |
| 6,477,558 B1 | 11/2002 | Irving | |
| 6,510,164 B1 | 1/2003 | Ramaswamy | |
| 6,594,774 B1* | 7/2003 | Chapman et al. | 714/2 |
| 6,665,867 B1 | 12/2003 | Ims et al. | |
| 6,748,554 B2* | 6/2004 | Jin et al. | 714/15 |
| 6,760,736 B2* | 7/2004 | Waldo et al. | 707/206 |
| 6,847,974 B2* | 1/2005 | Wachtel | 717/143 |
| 6,857,085 B1* | 2/2005 | Ruhlen et al. | 714/38.14 |
| 7,003,762 B2* | 2/2006 | Krueger | 717/126 |
| 7,035,959 B2* | 4/2006 | Umezu et al. | 710/315 |
| 7,127,511 B2 | 10/2006 | Tonouchi | |
| 7,272,640 B1 | 9/2007 | Kazemi et al. | |
| 7,328,406 B2 | 2/2008 | Kalinoski et al. | |
| 7,523,348 B2* | 4/2009 | Anand et al. | 714/16 |
| 7,558,864 B2 | 7/2009 | Kalantar et al. | |
| 7,644,410 B1 | 1/2010 | Graupner et al. | |
| 7,647,523 B2* | 1/2010 | Lindquist et al. | 714/4 |
| 7,673,054 B2* | 3/2010 | Bozak et al. | 709/228 |
| 7,689,971 B2* | 3/2010 | Peng et al. | 717/120 |
| 2001/0029550 A1* | 10/2001 | Endo et al. | 709/319 |
| 2002/0013835 A1* | 1/2002 | Umezu et al. | 709/223 |
| 2002/0073114 A1* | 6/2002 | Nicastro et al. | 707/500 |
| 2002/0194181 A1* | 12/2002 | Wachtel | 707/10 |
| 2002/0194251 A1* | 12/2002 | Richter et al. | 709/105 |
| 2003/0046393 A1 | 3/2003 | Mueller | |
| 2003/0055968 A1 | 3/2003 | Hochmuth et al. | |
| 2003/0208509 A1* | 11/2003 | Komine et al. | 707/200 |
| 2003/0212792 A1 | 11/2003 | Raymond | |
| 2004/0015851 A1* | 1/2004 | Newhook et al. | 717/116 |
| 2004/0064558 A1 | 4/2004 | Miyake | |
| 2004/0064570 A1* | 4/2004 | Tock | 709/228 |
| 2004/0139147 A1* | 7/2004 | Duquenne et al. | 709/200 |
| 2004/0153841 A1* | 8/2004 | Beck | 714/42 |
| 2004/0221203 A1* | 11/2004 | Ruhlen et al. | 714/38 |
| 2005/0015641 A1* | 1/2005 | Alur et al. | 714/2 |
| 2005/0182843 A1 | 8/2005 | Reistad et al. | |
| 2005/0193225 A1* | 9/2005 | Macbeth et al. | 714/2 |
| 2007/0250839 A1* | 10/2007 | Van Der Sanden et al. | 719/315 |
| 2008/0052718 A1 | 2/2008 | Hundscheidt | |
| 2008/0319857 A1 | 12/2008 | Dobbins et al. | |

OTHER PUBLICATIONS

A Generic Failure Detection Service for the Grid, Soonwook Hwang and, Soonwook Hwang, Carl Kesselman, Citeseer, 2003, pp. 1-15.*

S. Graupner et al., Control Architecture for Service Grids in a Federation of Utility Data Centers, HPL-2002-235, 2002, Hewlett-Packard, Palo Alto, CA.

S. Graupner et al., Making the Utility Data Center a Power Station for the Enterprise Grid, HPL-2003-53, Mar. 31, 2003, Hewlett-Packard, Palo Alto, CA.

S. Graupner et al., Impact of Virtualization on Management Systems, HPL2003-125, Jul. 14, 2003, Hewlett-Packard, Palo Alto, CA.

S. Graupner et al., Adaptive Control System for Server Groups in Enterprise Data Centers, HPL-2003-273, Jan. 14, 2004, Hewlett-Packard, Palo Alto, CA.

Sven Graupner et al., U.S. Appl. No. 10/997,360, filed Nov. 23, 2004.

Banerji et al., Web Services Conversation Language (WSCL) 1.0, Hewlett-Packard, Palo Alto, CA, Mar. 14, 2002. <http://www.w3.org/TR/2002/Note-wscl10-20020314>.

Björkander et al., Architecting System with UML 2.0, IEEE Software, Jul.-Aug. 2003, vol. 20, Issue 4, pp. 57-61, IEEE Computer Society, Los Alamitos, CA.

Foster et al., The Physiology of the Grid, An Open Grid Services Architecture for Distributed Systems Integration, Jun. 22, 2002.

Fox et al., Overview of Grid Computing Enviroments, Global Grid Forum, Lemont, IL, 2002.

Humphrey et al., Security Implications of Typical Grid Computing Usage Scenarios, Global Grid Forum, Lemont, IL, 2002.

Frank Leymann, Web Services Flow Language (WSFL 1.0), IBM Corporation, White Plains, NY, May 2001.

Sahai et al., Specifying and Monitoring Guarantees in Commercial Grids through SLA, 2002.

Singhal et al., Quatermaster—A Resource Utility System, Hewlett-Packard, Palo Alto, CA, Sep. 21, 2004.

Satish Thatte, Xlang, Web Services for Business Process Design, Microsoft Corporation, Redmond WA, 2001.

U.S. Appl. No. 10/997,360, Office Action dated Feb. 20, 2009, pp. 1-11 and attachments.

* cited by examiner

```
<?xml version="1.0"?>
<definitions name="User_X_ResourceRequestWorkflow"
             targetNamespace="http://user_X.com/resources/resources"
             xmlns:tns="http://user_X.com/resources/resources"
             xmlns:xlang="http://schemas.microsoft.com/biztalk/xlang"
             xmlns="http://schemas.xmlsoap.org/wsdl"
/>

<xlang:service name="resourceRequestWorkflow"/>
...
<xlang:port name="providerAPort" binding="tns:" >
<soap:address location="providerA_addressInformation"/>
</xlang:port>

<xlang:behavior>
  <xlang:body>
    <xlang:sequence>
      <xlang:action operation="ResourceRequest" port="providerAPort" activation="true"/>
      <xlang:switch xmlns:resourceNS="http://resource.com/reservationNS">
        <xlang:branch>
          <xlang:case> reservationNS:SUCCESS</xlang:case>
          <xlang:sequence>... <!--actions for case A--></xlang:sequence>
        </xlang:branch>
        <xlang:branch>
          <xlang:case> reservationNS:FAILED</xlang:case>
          <xlang:sequence>... <!--actions for case B--></xlang:sequence>
        </xlang:branch>
      </xlang:switch>
    </xlang:sequence>
  </xlang:body>
</xlang:behavior>
</xlang:service>
```

METHOD OF PROCESSING REQUEST BY SERVER COMPUTER SYSTEM

FIELD OF THE INVENTION

The present invention relates to the field of computing. More particularly, the present invention relates to the field of computing where a client requests activity by a server.

BACKGROUND OF THE INVENTION

In a network environment, an initiating computer (i.e., a client) sends a message to another computer (i.e., a server) requesting that the server perform some action. The World Wide Web employs this technique. A web browser (i.e., the client) requests web pages from a web server (i.e., the server). This technique has been widely used because it is easy to model and because it clearly distributes responsibilities between the client and the server. The server can perform only operations which the server exposes to the network. Upon an exception or undesirable results, the server contacts the client for instructions. Often, it would be desirable to resolve the exception or undesirable results at the server without further contact with the client.

SUMMARY OF THE INVENTION

The present invention comprises a method of processing a request by a server computer system. In an embodiment, the method begins with a step of receiving an object. The object comprises the request, an exception criterion, and a recovery operation. The method continues with a step of determining that the server computer system is unable to fulfill the request due to an exception which meets the exception criterion. The method concludes with a step of applying the recovery operation to resolve the exception.

In an embodiment, the server computer system comprises a resource management system for a shared computing environment and the object comprises a resource request object. The resource request object comprises a resource request, the exception criteria, and the recovery operation. The resource request indicates resources requested from the shared computing environment by a start time and for a time period.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

According to an embodiment, the present invention comprises a method of managing resources in a shared computing environment (e.g., a utility data center). According to another embodiment, the present invention comprises a system for managing resources in a shared computing environment. According to yet another embodiment, the present invention comprises a method of processing a request by a server computer system.

Figure 1:
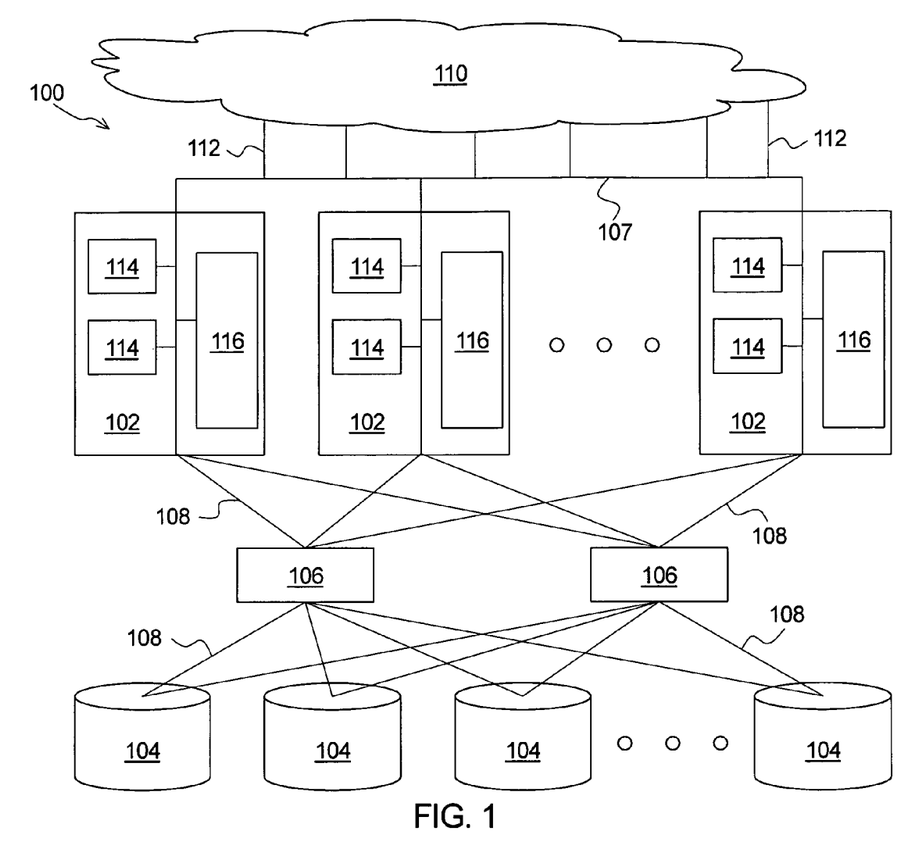
FIG. 1 schematically illustrates an embodiment of a shared computing environment which employs a method of managing resources of the present invention.

An embodiment of a shared computing environment which employs a method of managing resources of the present invention is illustrated schematically in FIG. 1. The shared computing system 100 comprises servers 102, disk arrays 104, switches 106, and a LAN (local area network) 107. Storage network links 108 couple the servers 102 and disk arrays 104 to the switches 106. The LAN 107 couples the servers 102 together. The LAN 107 couples an external network 110 (e.g., the Internet) via external network links 112. The servers 102 comprise processors 114 and memory 116 (which is a type of computer-readable medial).

A resource pool of the shared computing environment 100 comprises resource types. According to an embodiment, the resource types comprise the processors 114, memory, and storage. According to another embodiment, the resource types comprise the servers 102 and the disk arrays 104. Depending upon the resource type, the client requests a quantity or a capacity of a resource type. For example, the client may request two processors, 500 MB of memory capacity, and 100 GB of storage capacity. Alternatively, the client may request the resources in some other way such as one or more servers and one or more disk arrays.

Figure 2:
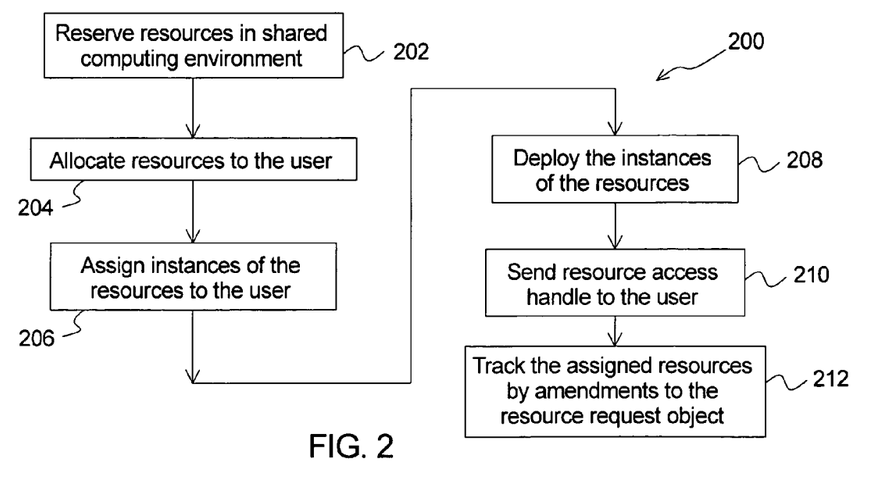
FIG. 2 illustrates an embodiment of a method of managing resources in a shared computing environment of the present invention as a flow chart.

An embodiment of the method of managing resources in the shared computing environment 100 of the present invention is illustrated as a flow chart in FIG. 2. The method 200 begins with a first step 202 of reserving the resources in the shared computing environment 100 (FIG. 1) for a client in response to a request for the resources contained in a resource request object. The client comprises a computer which couples to the shared computing environment via a network (e.g., the network 110). The resource request object requests resources from a resource pool of the shared computing environment 100. The resource request object indicates a time period for which the resources are requested (e.g., a profile). The time period may include a start time and an end time. Or, the time period may include the start time and continue indefinitely. The start time may be as soon as possible.

In an embodiment, the method 200 continues with a second step 204 of allocating the resources to the client (i.e., a resource allocation). The second step 204 does not assign instances of the resources. Rather, the second step 204 reduces an available resource pool by the resources for the time period which the client requested the resources. The second step 204 amends the resource request object so that it notes the resource allocation. In another embodiment, the method 200 does not perform the second step 204.

The method 200 continues with a third step 206 of assigning instances of the resources to the client. In a fourth step 208, the method 200 deploys the instances of the resources for the client by a start time. In a fifth step 208, the method sends a resource access handle to the client. The resource access handle provides the client with access to the resources by the start time. In a sixth step 210, the method tracks the assigned resources and other state information by amendments to the resource request object.

By tracking the resource request through amendment of the resource request object, the resource request object contains a context for the resource request. Thus, information regarding a particular resource request can be obtained by requesting the information from the resource request object or accessing the resource request object for the information. This information may be used by the resource provider or the client. For example, the resource provider may use this information in a migration between servers or storage resources. Or, for example, the client may use the information to determine whether the resources are performing adequately. As the client uses the resources for the time period, the resource request object is occasionally amended to indicate a current state. The current state updates the information held by the resource request object and may include a checkpoint for restart upon failure or migration. When the time period expires, the resources are returned to the resource pool.

Figure 3:
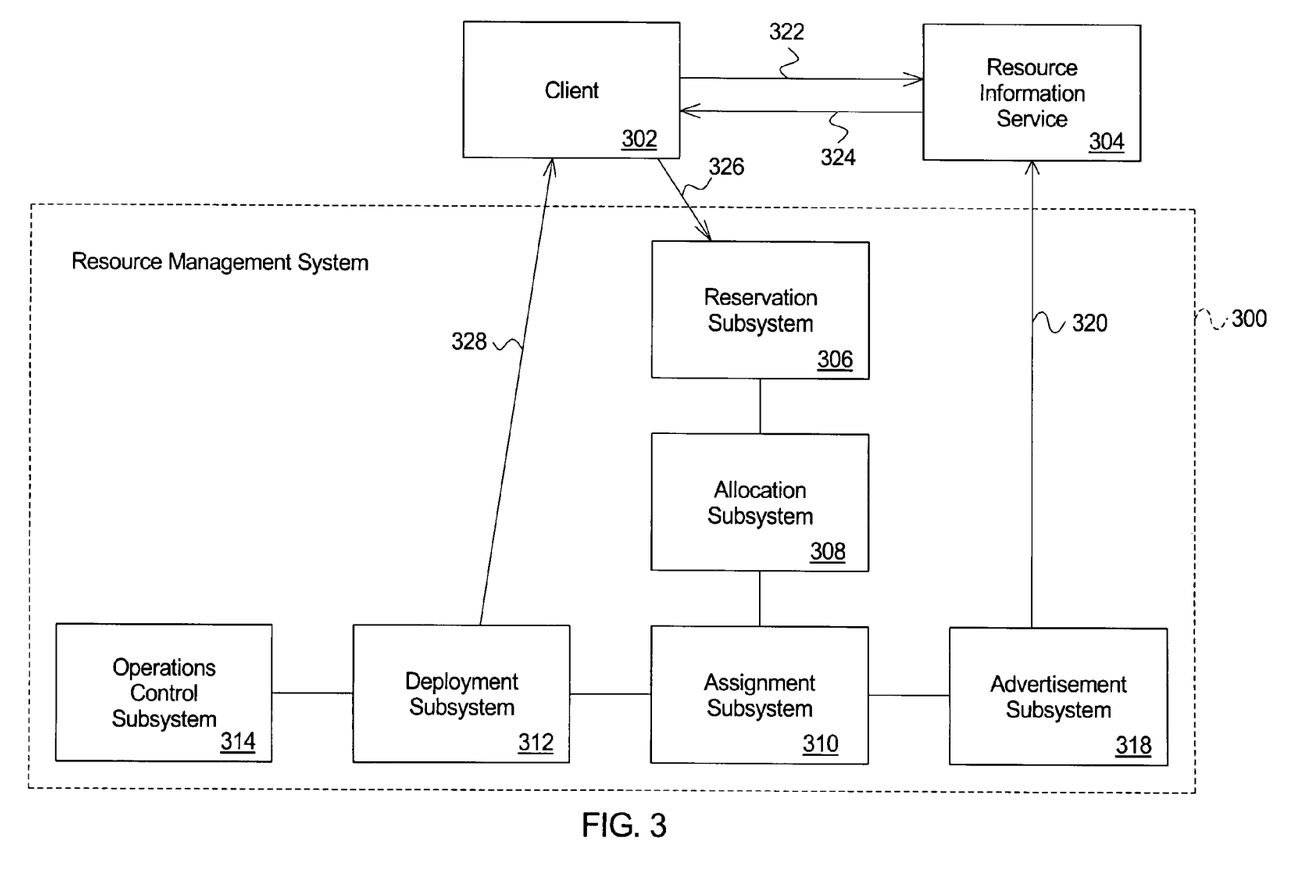
FIG. 3 schematically illustrates an embodiment of a resource management system of the present invention.

An embodiment of a resource management system of the present invention is illustrated schematically in FIG. 3. The resource management system manages resources in a shared computing environment (e.g., a utility data center). The resource management system 300 couples to a client 302 and a resource information service 304 via an external network (e.g., the Internet). In an embodiment, the resource management system 300 comprises a reservation subsystem 306, an allocation subsystem 308, an assignment subsystem 310, a deployment subsystem 312, an operations control subsystem 314, and an advertisement subsystem 318. The resource management system 300 may be implemented as software on one or more computers. For example, in the shared computing environment 100 (FIG. 1), the resource management system 300 may be software which executes on a separate computer (not shown) that is coupled to the network 107. Alternatively, the resource management system 300 may comprise one or more of the servers 102 of the shared computing environment.

In operation, the advertisement subsystem 318 (FIG. 3) extracts information from the shared computing environment to form a resource inventory. Alternatively, the information used to form the resource inventory is pushed (i.e., sent) to the advertisement subsystem 318. The resource inventory may be a table which indicates a series of time periods and the resource available within each time period. The advertisement subsystem 318 prepares descriptions of available resources from the resource inventory. The advertisement subsystem 318 occasionally sends advertisements 320 to the resource information service 304. The advertisements 320 comprise the descriptions of the available resources. Other resource management systems (not shown) also send advertisements to the resource information service 304. The resource information service 304 maintains a database of the available resources for the resource management system 300 and the other resource management systems.

In an embodiment, the client 302 submits a resource query 322 to the resource information service 304 in order to identify a resource provider with the best offering. The resource query 322 identifies desired capabilities such as resource types, resource quantities or capacities, available software packages, available operating systems, or available management platforms. The resource information service 304 returns a resource provider's contact information 324 which best meets the client's resource request. For example, the resource information service may return the resource management system 300 as the best resource provider for the client's request.

The client 302 prepares a complete resource request description and uses it to prepare a resource request object. The resource request object includes requested resource types, requested quantities or capacities of the resource types, a resource topology, and the time period for the request. The resource topology comprises network bandwidth (e.g., a LAN bandwidth, a SAN bandwidth, and a bandwidth for an Internet connection). The resource topology may also include a more detailed connection relationship between the resources. According to embodiments, the resource request object also includes optional information such as resource dependency descriptions, workload profile, alternative resource types, alternative resource quantities or capacities, alternative time periods, SLA (service level agreement) requirements, or policy information (e.g., recovery operations for responding to exceptions).

In an embodiment, the client 302 sends a message 326 containing the resource request object to the reservation subsystem 306. In another embodiment, the client 302 sends a reference to the reservation subsystem 306, which then accesses the resource request object. In this embodiment, the client 302 may retain the resource request object. Alternatively, the client 302 may send the resource request object to the resource management system 300 which places the resource request object in an accessible location for access by subsystems of the resource management system 300. The reservation subsystem 306 determines that the shared computing environment can fulfill the resource request contained in the resource request object based upon a comparison of the resource request to available resources (i.e., non-reserved resources). The reservation subsystem 306 passes the resource request object or a reference to the resource request object to the allocations subsystem 308, which allocates resources from the resource pool 318 for the time period identified in the resource request object. The resource allocation does not assign instances of the resources. Rather, the resource allocation reduces available resources by the resource quantities and capacities for the time period identified in the resource request object. The resource allocation subsystem 308 amends the resource request object to identify the resource allocation.

Just prior to when the resource request becomes due, the allocation subsystem 308 forwards the resource request object or a reference to the resource request object to the assignment subsystem 310. The particular time chosen for forwarding the resource request object or the reference to the resource request object is selected on the basis of providing sufficient time for accomplishing assignment of the resources. The assignment subsystem 310 assigns instances of the resources to the resource request object, amends the resource request object with an identification of the instances of the resources, and forwards the resource request object or a reference to the resource request object to the deployment subsystem 312.

The deployment subsystem 312 deploys the resources to meet the requirements of the resource request object. This may include configuring a topology for the resources or initializing the resources. The deployment subsystem 312 sends a message 328 containing a resource access handle to the client 302. The resource access handle provides access to the resources by the start time of the time period in the resource request object. The deployment subsystem 312 amends the resource request object to identify the deployment and forwards the resource request object or a reference to the resource request object to the operations control subsystem 314.

As the client 302 employs the resources, the operations control subsystem 314 monitors and controls the resources. This may include implementing policy contained in the resource request object. Occasionally, the operations control subsystem 314 amends the resource request object to identify a state of the resources.

Figure 4:
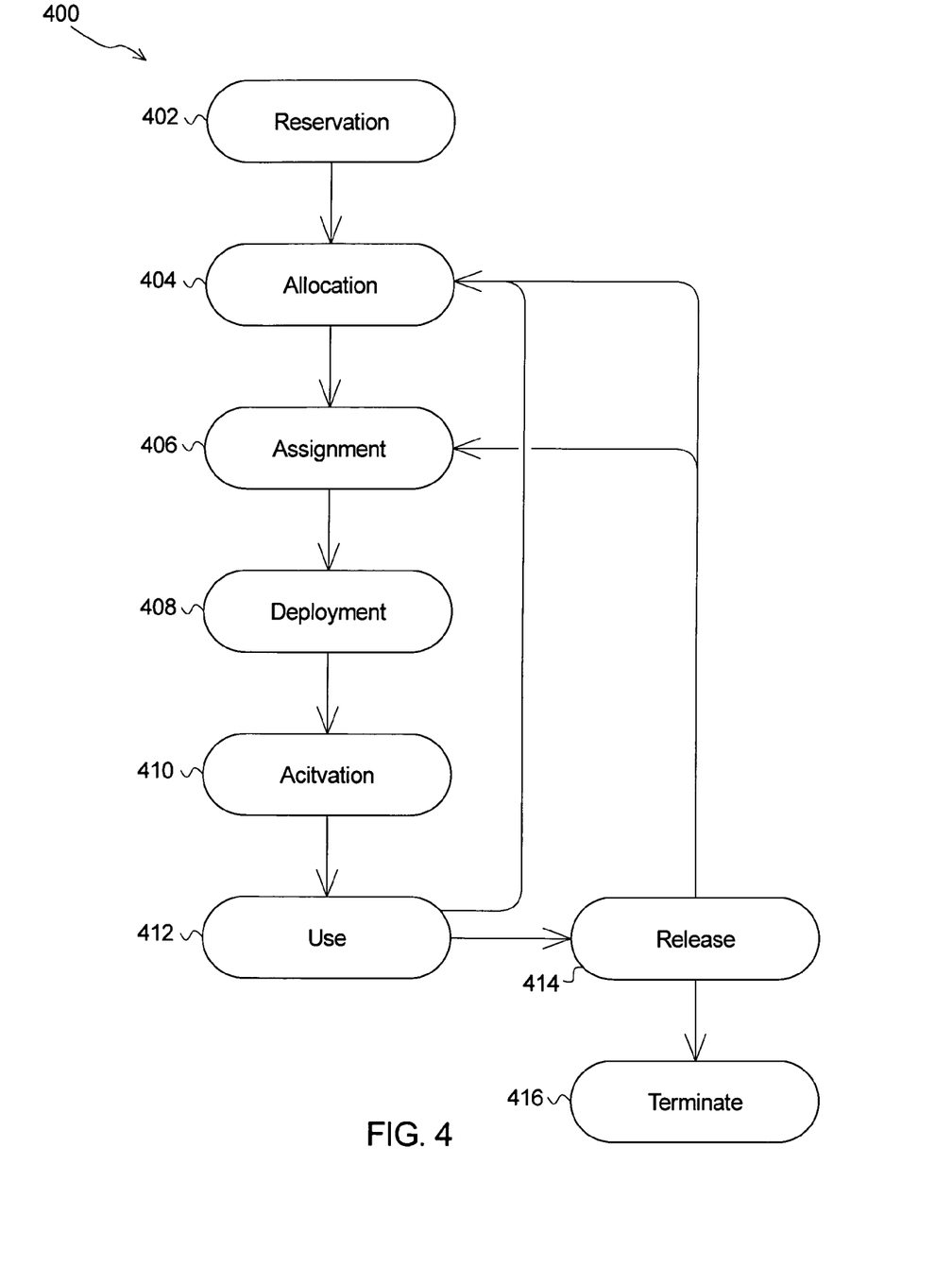
FIG. 4 illustrates an embodiment of a workflow for a resource request of the present invention as a state diagram.

An embodiment of a workflow for a resource request of the present invention is illustrated as a state diagram in FIG. 4. The workflow 400 begins with a reservation state 402. The reservation state 402 begins with receipt of a resource request object or a reference to the resource request object. The resource request object contains a resource request. The reservation state 402 can accept the resource request and, thus, create a reservation. The reservation state 402 can reject the resource request and cause the resource request object to be returned to the client. The reservation state 402 can reject the resource request and cause the resource request object to be forwarded to another resource management system according to a workflow instruction contained in the resource request object. Rejection of the resource request may be on the basis that there are insufficient available resources to fulfill the request.

If the reservation state 402 accepts the reservation, the reservation state 402 can also allocate resources to the reservation and amend the resource request object to identify the resource allocation. Alternatively, the resource request or a reference to the resource request object can be passed to an allocation state 404, which allocates the resources for the reservation and amends the resource request object to identify the resource allocation. The resource request waits in the reservation state 402 or the allocation state 404 until just before the resource become due.

Before the resources become due, the resource request passes to an assignment state 406. The assignment state 406 assigns instances of the resources to the resource request and amends the resource request object to identify the instances of the resources. The instances of the resources are selected from a pool of available resources. The resource request then passes to a deployment state 408.

The deployment state 408 creates a specific arrangement of the assigned resources to meet the client's requirements and amends the resource request object to identify the specific arrangement. The resource request then passes to an activation state 410.

The activation state 410 gives the client access to the resources by sending the resource access handle to the client. The activation state 410 amends the resource request object to indicate that the resources have been activated for the client. The resource request then passes to a use state 412 in which the client makes use of the resources. While the resources are in the use state 412, they are unavailable for allocation. In the use state 412, the resource request object is occasionally amended to identify a current state of the resources.

Eventually, the time period identified in the resource request object expires and the resource request object passes to a release state 414. The release state 414 moves the resource back into an available resource pool so that the resources can be allocated and assigned to other future requests. The release state 414 can also include cleaning states from the resources after use for security purposes. The resource request then proceeds to a termination state 416 which ends the client's association with the resource management system for this resource request.

Figure 5:
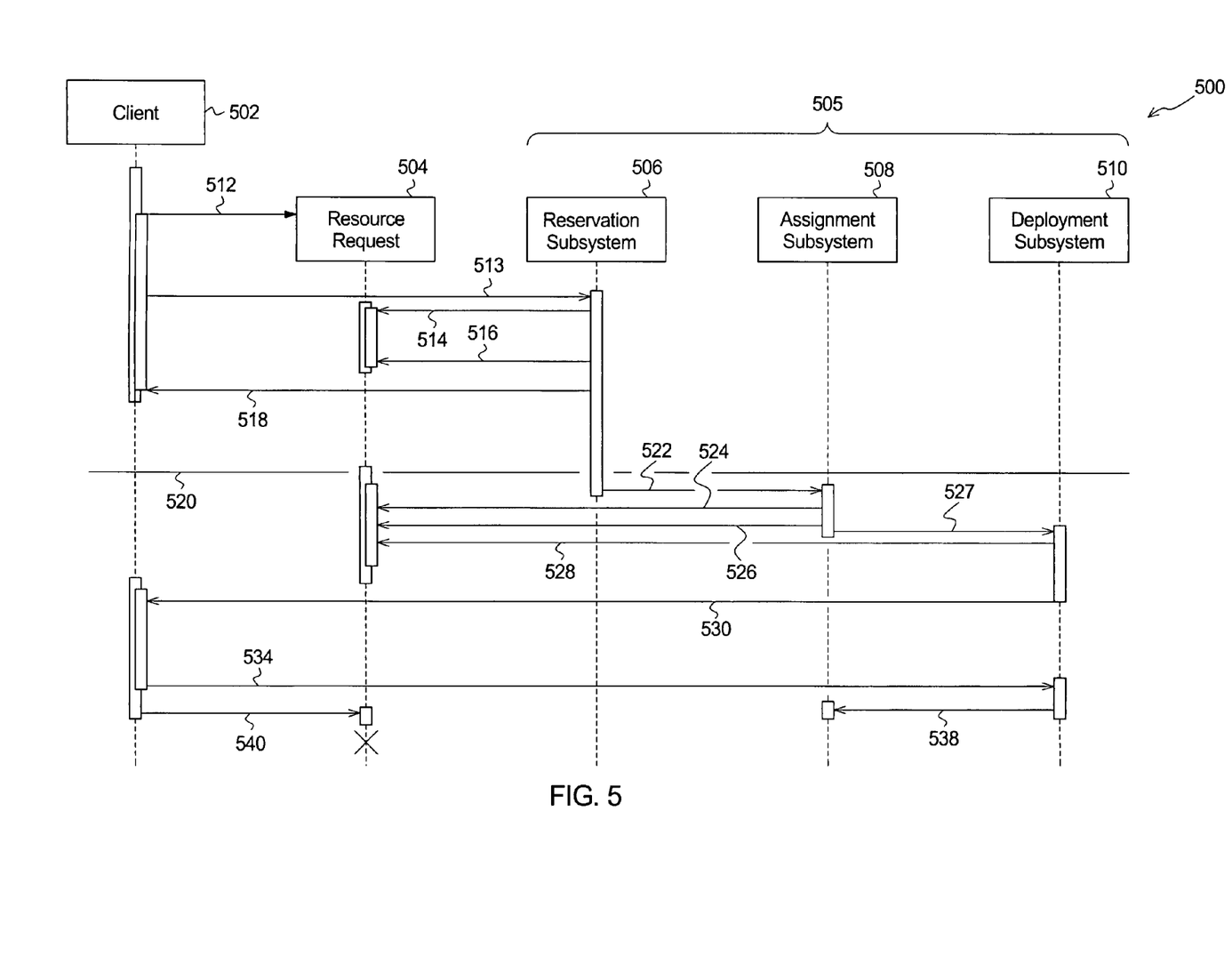
FIG. 5 illustrates an embodiment of a workflow for a resource request of the present invention as a sequence diagram.

An embodiment of a workflow for a resource request of the present invention is illustrated as a sequence diagram in FIG. 5. The workflow 500 is described relative to a client 502, a resource request object 504, and a resource management system 505. The resource management system 505 comprises a reservation subsystem 506, an assignment subsystem 508, and a deployment subsystem 510. The workflow 500 begins with the client 502 querying a resource information service (not shown) and receiving an identification of the resource management system 505 which should be able to fulfill the client's requirements.

The workflow 500 continues with the client 502 creating the resource request object 504 in a first action 512. The resource request object 504 identifies the client's requirements and may include workflow instructions. According to an embodiment, the workflow instructions implement predefined policies (i.e., recovery operations) upon encountering workflow exceptions.

The client 502 sends a message 513 to the reservation subsystem 506 which references the resource request object 504. In an embodiment, the client sends the resource request object 504 to the resource management system 505. In another embodiment, the client 502 retains the resource request object. The reservation subsystem 506 reads the resource request object in a read operation 514 to determine the resource request contained in the resource request object. In an embodiment, the reservation subsystem 506 allocates resources to the resource request object and indicates the resource allocation by an amendment 516 to the resource request object 504. In another embodiment, an allocation subsystem (not shown) allocates the resources and amends the resource request object 504. In an embodiment, the reservation subsystem 506 sends an acknowledgment 518 indicating that a reservation has been accepted.

In an alternative embodiment, the reservation subsystem 506 rejects the reservation. In such an embodiment, the reservation subsystem 506 may forward a reference to the resource request object 504 to another resource management service in accordance with the workflow instructions. Alternatively, the reservation subsystem 506 may notify the client 502 of the rejection.

Preferably, if the reservation subsystem accepts the reservation, the reservation subsystem waits until a time 520 which is just prior to when the reservation becomes due. The reservation subsystem 506 then forwards a reference to the resource request object 504 to the assignment subsystem 508 in a message 522. Alternatively, the reservation subsystem sends the message 522 including the reference to the resource request object at an earlier time.

In an embodiment, the assignment subsystem 508 reads the resource request object in a read operation 524, assigns the resources according to the resource request object, and notes the assignment by amending the resource request object 504 in a message 526. In an embodiment, the assignment subsystem 508 notifies the reservation subsystem 506 of the assignment in a message (not shown).

In an alternative embodiment, the assignment subsystem 508 fails to assign the resources 508. For example, while the reservation subsystem 506 may have reserved sufficient resources for the resource request, by the time of allocation there might be insufficient resources available for the resource request due to an unexpected failure of some resources. According to such an embodiment, the assignment subsystem 508 may try to assign the resource according to the workflow instructions again. Alternatively, the assignment subsystem 508 may notify the reservation subsystem 506 of the failure to assign resources. In response, the reservation subsystem may forward a reference to the resource request object to an alternative resource management service that can assign the resources according to the workflow instructions in a message (not shown).

If the assignment subsystem 508 assigns the resources to the resource request object 504, the assignment subsystem 508 forwards a reference to the resource request object 504 to the deployment subsystem 510 in a message 527. The deployment subsystem 510 reads the resource request from the resource request object in a read operation 528, activates the resource for the client, and configures a topology for the client. The deployment subsystem 510 provides a resource access handle to the client in a message 530.

The resource access handle provides the client 502 with the ability to use the resources by the start time for the time period indicated in the resource request object 504. The client 502 makes use of the resources during the time period. Occasionally during the use, an operations control subsystem (not shown) updates the resource request object with a current state of the resources. At the end of the time period, the client releases the resources via a message 534 to the deployment system 510. The deployment subsystem 510 returns the resources to an available resource pool and notifies the assignment subsystem 510 of the release via a message 538. The client 502 terminates the session via a message 540 to the resource request object 504, which deletes the resource request object and the session state information held by the resource request object.

Figure 6:
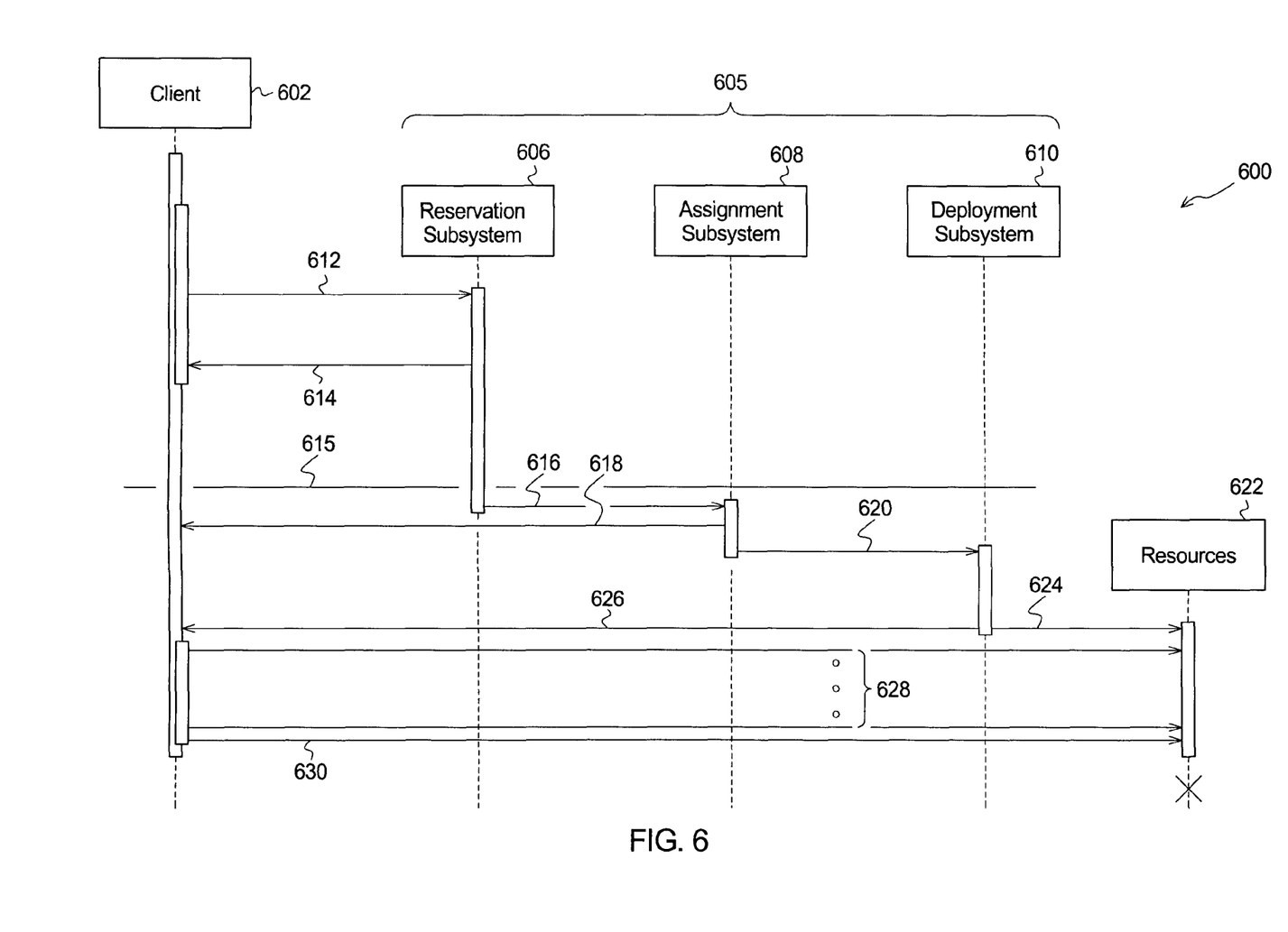
FIG. 6 illustrates an alternative embodiment of a workflow for a resource request of the present invention as a sequence diagram.

An alternative embodiment of a workflow is illustrated in FIG. 6 as a sequence diagram. The workflow 600 is described relative to a client 602, a resource request object (not shown), and a resource management system 605. The resource management system 605 comprises a reservations subsystem 606, an assignment subsystem 608, and a deployment subsystem 610. The workflow 600 begins with the client 602 querying a resource information service (not shown) and receiving an identification of the resource management system 605 which should be able to fulfill the client's requirements. The workflow 600 continues with the client 602 creating the resource request object. The resource request object identifies the client's requirements (i.e., a resource request) and may include workflow instructions. According to an embodiment, the workflow instructions implement pre-defined policies (i.e., recovery operations) upon encountering workflow exceptions.

The workflow 600 continues with the client 602 submitting the resource request object to the reservation subsystem 606 in a transmission 612. The reservation subsystem 606 determines whether to accept the resource request. If the resource request is accepted, the reservation subsystem 606 notifies the client 602 of the acceptance in a transmission 614 and amends the resource request object to indicate the acceptance. If the resource request is rejected, the reservation subsystem 606 forward the resource request object to an alternative resource management system (not shown) according to the workflow instruction contained in the resource request object. If the workflow instructions do not indicate an alternative resource management system and the resource request is rejected, the reservation subsystem 606 returns the resource request object to the client 602.

Upon accepting the resource request, the reservation subsystem 606 preferably waits until a time 615 just prior to the reservation becoming due and then forwards the resource request object to the assignment subsystem 608 in a transmission 618. Alternatively, the reservation subsystem forwards the resource request object to the assignment subsystem 608 at an earlier time.

Preferably, the assignment subsystem 608 assigns the resources according to the resource request contained in the resource request object, amends the resource request object to indicate the assignment, and forwards the resource request object to the deployment subsystem 610 in a transmission 620. Alternatively, the assignment subsystem 608 fails to assign the resource, notes the failure in the resource request object, and responds to the failure according to the workflow instructions or returns the resource request object to the client 602.

The deployment subsystem 610 activates the resources 622 for the client 602 in a transmission 624. The activation of the resources 622 includes configuring a topology for the resources 622. The deployment subsystem 610 also provides a resource access handle to the client 602 in a transmission 626. The resource access handle allows the client 602 to use the resources 622 by the start time and for the time period indicated in the resource request object. The client 602 makes use of the resources 622 during the time period indicated a series of transmissions 628. At the end of the time period, the client 602 releases the resources 622 in a transmission 630.

The resource management system 300 (FIG. 3) and the workflows 400, 500, and 600 (FIGS. 4, 5, and 6, respectively) of the present invention provide several benefits. A first benefit is that multiple resource providers can each employ a resource management system, which allows clients to request resources from multiple sources.

A second benefit is that the resource management system automatically coordinates multiple resource requests from different clients. Each resource request moves through its workflow proceeding to an appropriate subsystem according to a state of the workflow, which distributes a processing load over the subsystems.

A third benefit is that, because each resource request object accessed by a resource management system may include workflow instructions, each client can provide independent instructions for its workflow to the resource management system.

A fourth benefit is that resource pools may be coupled to an enterprise wide grid or a public resource grid in which clients request resource from various resource management services. This allows resource providers to join, leave, or change their offerings dynamically. It also allows clients to evaluate offerings and to choose a preferred resource provider.

A fifth benefit is that a workflow for a resource request centers on the resource request object which holds a context of the resource request including a current state of the resource request. This allows the resource request to be modified by the client by contacting the resource request object, possibly in response to a workflow exception or possibly due to a changed need for the resources. It also allows checkpointing of a resource request in execution and transferring the resource request to another resource management system by forwarding the resource request object or a reference to the resource request object.

A sixth benefit is that the present invention modularizes various tasks associated with a resource request. This includes having an external resource information service which provides clients with a central location for evaluating various resource providers. This also includes having various subsystems in the resource management system to handle different tasks associated with a resource request.

As discussed above, embodiments of the resource request object include workflow instructions for handling workflow exceptions. These embodiments employ a method of processing a request by a server computer system of the present invention which may be used for requesting resources or in other situations such as business processes or e-commerce applications.

Figure 7:
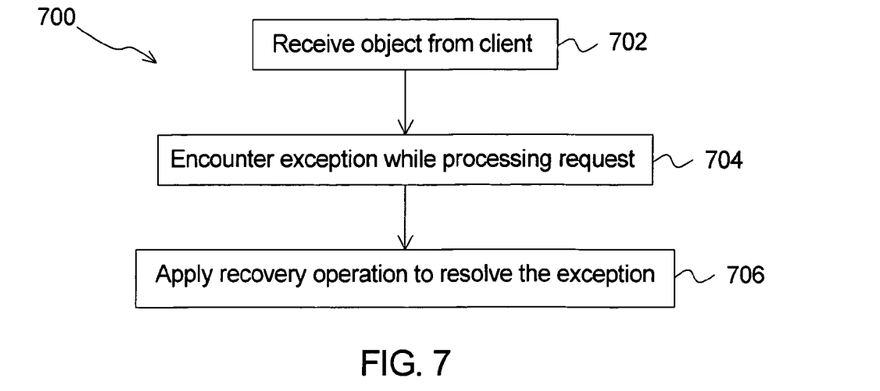
FIG. 7 illustrates an embodiment of a method of processing a request by a server computer system of the present invention as a flow chart.

An embodiment of a method of processing a request by a server computer system of the present invention is illustrated as a flow chart in FIG. 7. The method begins with a first step 702 of receiving an object from a client. The object comprises the request and workflow instructions. In an embodiment, the workflow instructions comprise an exception criterion and a recovery operation. In another embodiment, the workflow instructions comprise first through nth exception criteria and first through nth recovery operations where the first recovery operation provides instructions for resolving a first exception that meets the first exception criterion, a second recovery operation provides instructions for resolving a second exception that meets a second exception criterion, and so forth through the nth recovery operation providing instructions for resolving an nth exception which meets the nth exception criterion. In yet another embodiment, a particular recovery operation provides instructions for resolving a group of exceptions. If any of the group of exceptions is encountered, the particular recovery operation is employed to resolve it. The workflow instructions may be written in a workflow language. According to embodiments, the workflow language comprises XLANG, WSFL (web services flow language), WSCL (web services conversion language), or another workflow description language or formalism.

In an embodiment, the method continues with a second step 704 of encountering the exception while processing the data. In this embodiment, the method concludes with a third step 706 of applying the recovery operation contained in the object. In another embodiment, the second step 704 encounters a particular exception within the first through nth exceptions. In this embodiment, the third step 706 applies a particular recovery operation within the first through nth recovery operations corresponding to the particular exception. For example, if the server encounters the second exception, the server applies the second recovery operation to resolve it. In yet another embodiment, the second step 704 encounters one of a group of exceptions. In this embodiment, the third step 706 applies a recovery operation which applies to any of the group of exceptions.

Figure 8:
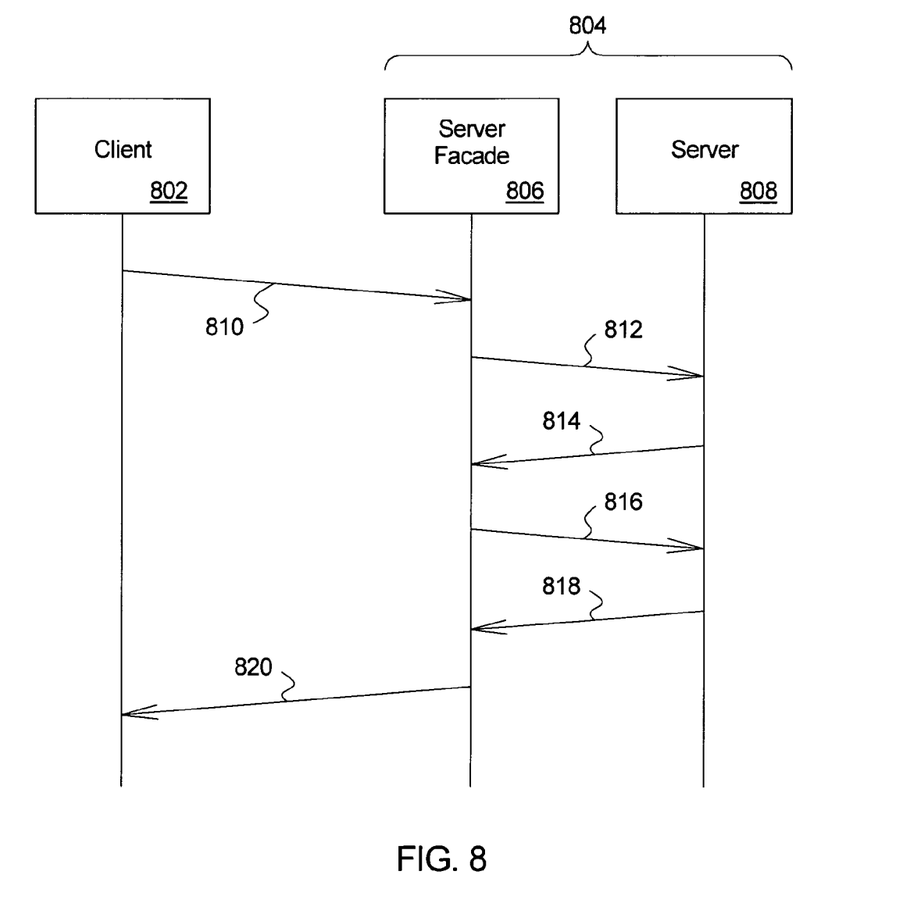
FIG. 8 illustrates an embodiment of a method of processing a request by a server computer system of the present invention as a sequence diagram.

An embodiment of a method of processing a request by a server computer system of the present invention is illustrated as a sequence diagram in FIG. 8. The method 800 is discussed relative to a client 802 and the server computer system 804. In an embodiment, the server computer system comprises a server façade 806 and a server 808. The server façade 806 may reside on a computer separate from the computer on which the server 808 resides. Alternatively, the server façade 806 and the server 808 may be nodes of a single computer. Prior to the method 800 beginning, the client sends an object that includes the request, an exception criterion, and a recovery operation to the server façade 806 in a transmission 810. The server façade 806 forwards the request to the server 808 in a transmission 812. The server 808 might not respond to the request (i.e., be unavailable) or may attempt to begin processing the request but encounters an exception. If the server 808 is unavailable, the server façade 806 notes the unavailability as an exception. Or, if the server 808 encounters the exception, the server 808 notifies the server façade 806 of the exception in a transmission 814. The server façade 806 recognizes the exception as meeting the exception criterion and implements the recovery operation. The recovery operation may take many forms. For example, the recovery operation may direct the server façade 806 to forward a modified request to the server 808 in a transmission 816. In response, the server 808 may complete the processing of the request and return results to the server facade 806 in a transmission 818, which in turn returns the results to the client in a transmission 820. Or, the recovery operation may direct the server façade 806 to forward the object to another server (not shown).

An exemplary embodiment of a method of processing a request by a server computer system involves a web browser (i.e., a client), a first web server, and a second web server. The user of the web browser wants an index from the first web server but, if the index is unavailable from the first web server, the user wants an index from the second web server. The web browser sends a request to the first web server, which may take the form:

GET/index.html HTTP 1.1
User-Agent: Mozilla/4.0
Host: "first web server"
On-Exception-404: GET/index.html (Host: "second web server")
Connection: Keep-Alive If the first web server is able to respond correctly with the index, it does so. If the first web server encounters an error (indicated by code 404), the first web server implements recovery operation indicated in the line "On-Exception-404" and forwards the request for an index to the second web server.

Another recovery operation may be nested within a first recovery operation. For example, in the exemplary embodiment above, a second "On-Exception-404" may follow "Host: "second web server," which identifies a third web server from which to obtain the index upon encountering an error (indicated by code 404) at the second web server.

Figure 9:
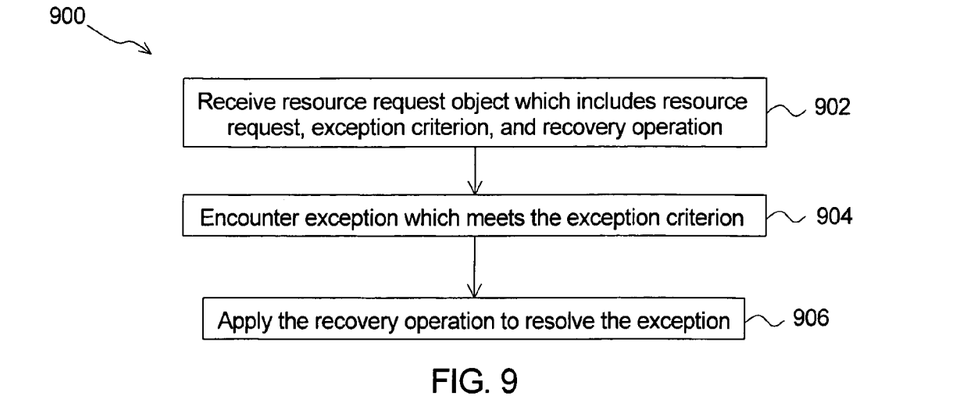
FIG. 9 illustrates an embodiment of a method of processing a resource request by a resource management system of the present invention as a flow chart.

An embodiment of a method of processing a resource request by a resource management system of the present invention is illustrated as a flow chart in FIG. 9. The method 900 begins with a first step 902 of receiving a resource request object. The resource request object comprises the resource request and workflow instructions. The workflow instructions comprise one or more exception criteria and one or more recovery operations. The resource request indicates resources requested from the shared computing environment (e.g., a utility data center) and a time period for uses of the resources. The time period may be a definite time period with a particular start time and a particular end time. Or, the time period may have a flexible start time or a flexible end time. Or, the time period may have a start time but extend for an indefinite period.

Figure 10:
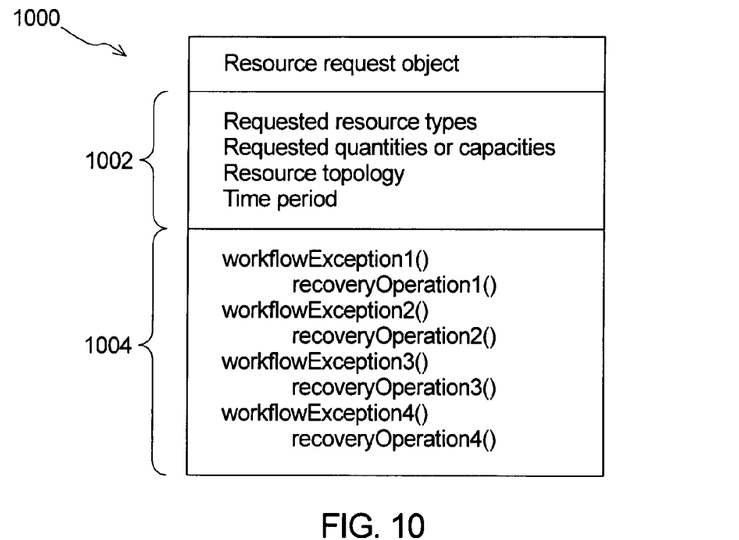
FIG. 10 illustrates an embodiment of a resource request of the present invention as a class diagram.

An embodiment of the resource request object is illustrated as a class diagram in FIG. 10. The resource request object 1000 comprises the resource request 1002 and the workflow instructions 1004. The resource request 1002 comprises requested resource types, requested quantities or capacities of the resource types, a resource topology, and a time period.

The workflow instructions 1004 comprise the exception criteria and the recovery operations corresponding to the exception criteria.

The method 900 (FIG. 9) continues with a second step 904 of encountering an exception which meets an exception criterion within the exception criteria of the workflow instructions 1004 (FIG. 10). The method 900 concludes with a third step 906 of applying the recovery operation to resolve the exception.

Figure 11:
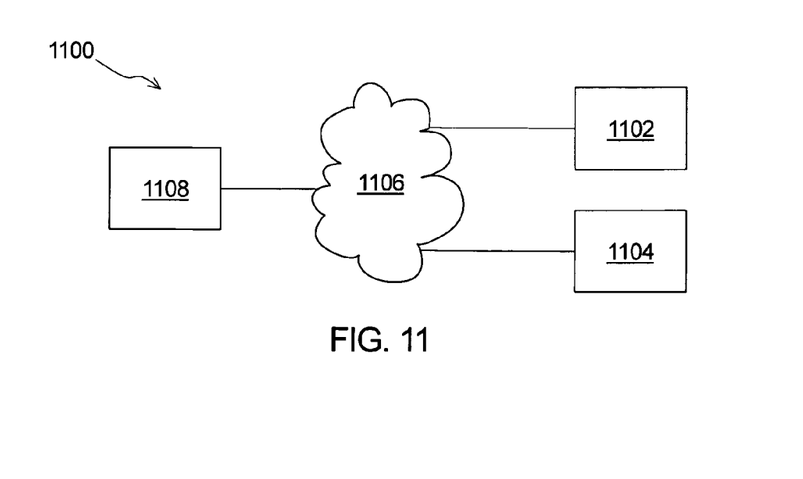
FIG. 11 schematically illustrates first and second resource management systems which employ a method of processing a resource request of the present invention.

An embodiment of first and second resource management systems which employ the method of processing a resource request of the present invention are illustrated schematically in FIG. 11. The first and second resource management systems, 1102 and 1104, couple to a network 1106. A client 1108 also couples to the network 1106. In operation, the client sends the resource request object to the first resource management system 1102 requesting resources from a first shared computing environment (not shown). The resource request object includes workflow instructions which comprise exception criteria and corresponding recovery operations.

A first exception may occur when the resource request object is within a reservation state of a resource request workflow for the first resource management system 1102. The first exception is a determination by the first resource management system 1102 that available resources for the requested time period are insufficient to fulfill the resource request. According to an embodiment, the workflow instructions include a recovery operation for this exception which instructs the first resource management system 1102 to attempt to fulfill an alternative resource request. According to another embodiment, the workflow instructions include a recovery operation for this exception which instructs the first resource management system 1102 to forward the resource request object to the second resource management system 1104. According to another embodiment, the workflow instructions include a recovery operation which instructs the first resource management system 1102 to return the resource request object to the client 1108. According to another embodiment, the workflow instructions include a recovery operation which instructs the first resource management system 1102 to propose one or more alternatives to the client.

A second exception may occur when the resource request object is within an assignment state of the resource request workflow. The second exception is a determination by the first resource management system 1102 that there are insufficient resources to fulfill the resource request. According to embodiments, the workflow instructions include recovery operations which provide various alternative workflows for resolution of the lack of sufficient resources to fulfill the resource request.

Various exceptions may occur during use of the resources by the client. According to embodiments, the workflow instructions provide instructions for resolving these exceptions.

According to an embodiment, each subsystem that receives the resource request object or a reference to the resource request object includes a capability to interpret the workflow instructions included in the resource request object. According to an embodiment, a subsystem accomplishes this capability through a process launched for each resource request object that the subsystem receives. The process comprises a workflow interpreter and a messaging capability. When a subsystem determines that the resource request object or a reference to it is to be sent to another subsystem, the process gathers a current state of the resource request and amends the resource request object to include the current state. The process then terminates. When the other subsystem receives the resource request object or the reference to it, the other system launches another process which includes the workflow interpreter and the messaging capability.

According to an embodiment, the workflow is implemented as a finite state machine. The finite state machine comprises a set of states which describe the workflow, a set of transitions described in the workflow, and a current state of the workflow. The current state comprises a minimum amount of information that needs to be passed with the resource request object when it is passed from a first subsystem to a second subsystem.

Figure 12:
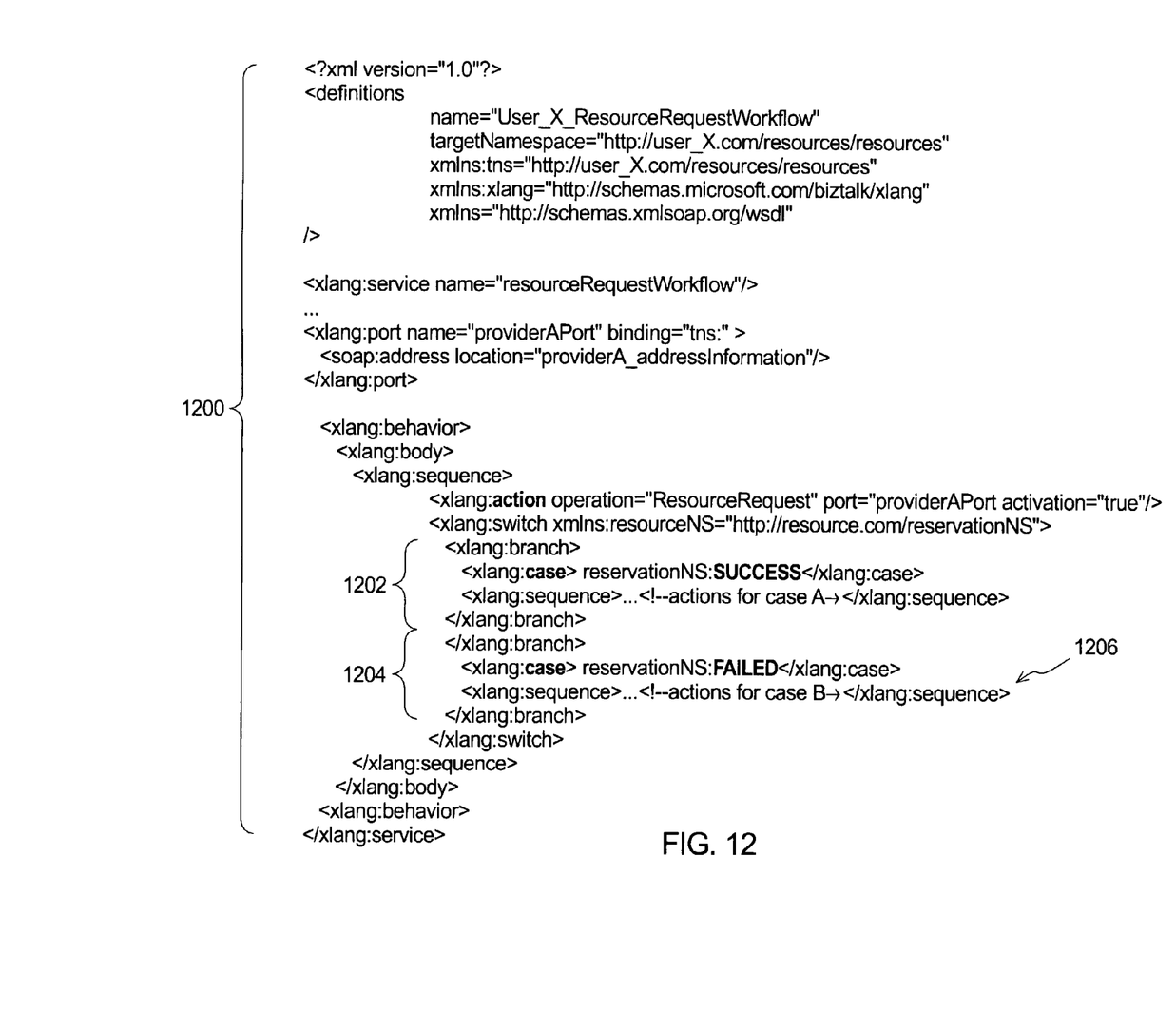
FIG. 12 illustrates an exemplary set of workflow instructions of the present invention as XLANG code.

An exemplary set of workflow instructions is provided in FIG. 12. The exemplary set of workflow instructions 1200 are written in XLANG. The exemplary set of workflow instructions 1200 provide workflow instructions to a reservation subsystem for a successful reservation 1202 and a failed reservation 1204 (i.e., an exception) as well as a recovery operation 1206 for the failed reservation 1204.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of processing a resource request comprising:
   receiving, by a server computer system, a reservation resource request object which comprises the resource request that seeks resources within a shared computing environment, a plurality of exception criteria, and a plurality of recovery operations, wherein each of the recovery operations contained in the reservation resource request object includes instructions to resolve a respective exception meeting a corresponding one of the exception criteria contained in the reservation resource request object;
   determining that the server computer system is unable to fulfill the request due to a particular exception;
   determining, by the server computer system, that the particular exception meets a particular one of the exception criteria contained in the reservation resource request object; and
   in response to determining that the particular exception meets the particular exception criterion, the server computer system applying the recovery operation corresponding to the particular exception criterion to resolve the particular exception.

2. The method of claim 1 wherein the particular exception comprises a problem encountered while processing the resource request.

3. The method of claim 2 wherein the recovery operation corresponding to the particular exception criterion comprises processing another request.

4. The method of claim 2 wherein the recovery operation corresponding to the particular exception criterion comprises processing a modified request.

5. The method of claim 2 wherein the recovery operation corresponding to the particular exception criterion comprises forwarding the resource request object to another server computer system.

6. The method of claim 1 wherein the particular exception is an inability to process the resource request.

7. The method of claim 6 wherein the recovery operation corresponding to the particular exception criterion comprises forwarding the resource object to another server computer system.

8. The method of claim 1 wherein the server computer system comprises a resource management system for a shared computing environment.

9. The method of claim 8 further comprising launching a process within the resource management system which acts on behalf of the resource request object when encountering the particular exception.

10. The method of claim 9 wherein the process updates state information related to the resource request object.

11. The method of claim 10 wherein the process amends the resource request object with the state information.

12. The method of claim 1 wherein the particular exception comprises an inability to reserve the resources.

13. The method of claim 12 wherein the recovery operation corresponding to the particular exception criterion comprises returning the resource request object to a requestor.

14. The method of claim 12 wherein the recovery operation corresponding to the particular exception criterion comprises forwarding the resource request object to a second resource management system for a second shared computing environment.

15. The method of claim 12 wherein the recovery operation corresponding to the particular exception criterion comprises forwarding the resource request object to a resource broker for further forwarding to a second resource management system for a second shared computing environment.

16. The method of claim 12 wherein the recovery operation corresponding to the particular exception criterion comprises proposing alternative resources to a requestor.

17. The method of claim 12 wherein the recovery operation corresponding to the particular exception criterion comprises proposing alternative timelines to a requestor.

18. The method of claim 1 wherein the particular exception comprises an inability to assign the resources.

19. A method of processing a resource request for a shared computing environment comprising:
receiving, by a server computer system, a reservation resource request object which comprises the resource request, a plurality of exception criteria, and a plurality of recovery operations corresponding to the plurality of exception criteria, the resource request indicating resources requested from the shared computing environment by a start time and for a time period, wherein each of the plurality of recovery operations contained in the resource request object includes instructions to resolve a respective exception meeting a corresponding one of the exception criteria contained in the reservation resource request object;
determining that the server computer system is unable to fulfill the resource request due to a particular exception;
determining, by the server computer system, that the particular exception meets a particular one of the plurality of exception criteria; and
applying, by the server computer system, one of the recovery operations corresponding to the particular exception criterion to resolve the particular exception.

20. The method of claim 19 wherein the particular exception comprises an inability to reserve the resources.

21. The method of claim 20 wherein the applied recovery operation comprises returning the resource request object to a requestor.

22. The method of claim 20 wherein the applied recovery operation comprises forwarding the resource request object to a second resource management system for a second shared computing environment.

23. The method of claim 20 wherein the applied recovery operation comprises forwarding the resource request object to a resource broker for further forwarding to a second resource management system for a second shared computing environment.

24. The method of claim 20 wherein the applied recovery operation comprises proposing alternative resources to a requestor.

25. The method of claim 20 wherein the applied recovery operation comprises proposing alternative timelines to a requestor.

26. The method of claim 19 wherein the particular exception comprises an inability to assign the resources.

27. The method of claim 19 further comprising launching a process within the resource management system which acts on behalf of the resource request object when encountering the particular exception.

28. The method of claim 27 wherein the process updates state information related to the resource request object.

29. The method of claim 28 wherein the process amends the resource request object with the state information.

30. A non-transitory computer readable media comprising computer code for implementing a method of processing a resource request by a server computer system, the method of processing the request comprising:
receiving a reservation resource request object which comprises the resource request that seeks resources within a shared computing environment, a plurality of exception criteria, and a plurality of recovery operations corresponding to the plurality of exception criteria, wherein each of the plurality of recovery operations contained in the object includes instructions to resolve a respective exception meeting a corresponding one of the exception criteria contained in the reservation resource request object;
determining that the server computer system is unable to fulfill the request due to a particular exception;
determining that the particular exception meets a particular one of the plurality of exception criteria; and
applying one of the recovery operations corresponding to the particular exception criterion to resolve the particular exception.

31. The computer readable media of claim 30, wherein the resource request seeks resources within the shared computing environment by a start time and for a time period.

32. A computer comprising:
a processor to:
receive a reservation resource request object which comprises a resource request, a plurality of exception criteria, and a plurality of recovery operations corresponding to the plurality of exception criteria, the resource request indicating resources requested from a shared computing environment by a start time and for a time period, wherein each of the plurality of recovery operations contained in the reservation resource request object includes instructions to resolve a respective exception meeting a corresponding one of the exception criteria contained in the reservation resource request object;
determine that a resource management system is unable to fulfill the resource request due to a particular exception;
determine that the particular exception meets a particular one of the plurality of exception criteria; and
apply one of the recovery operations corresponding to the particular exception criterion to resolve the particular exception.

* * * * *